United States Patent
Eklind et al.

(10) Patent No.: US 12,448,713 B2
(45) Date of Patent: Oct. 21, 2025

(54) METHOD FOR IN-LINE TREATMENT OF A THREAD AND A SYSTEM THEREFORE COMPRISING A TREATMENT UNIT AND A THREAD SPEED SENSOR

(71) Applicant: COLOREEL GROUP AB, Jönköping (SE)

(72) Inventors: Martin Eklind, Jönköping (SE); Joakim Staberg, Jönköping (SE)

(73) Assignee: COLOREEL INTERNATIONAL HOLDINGS LIMITED, Hong Kong (CN)

( * ) Notice: Subject to any disclaimer, the term of this patent is extended or adjusted under 35 U.S.C. 154(b) by 593 days.

(21) Appl. No.: 17/275,759

(22) PCT Filed: Aug. 27, 2019

(86) PCT No.: PCT/SE2019/050793
§ 371 (c)(1),
(2) Date: Mar. 12, 2021

(87) PCT Pub. No.: WO2020/055299
PCT Pub. Date: Mar. 19, 2020

(65) Prior Publication Data
US 2022/0034010 A1 Feb. 3, 2022

(30) Foreign Application Priority Data
Sep. 15, 2018 (SE) .................................. 1851096-6

(51) Int. Cl.
*D06P 5/30* (2006.01)
*B41J 3/407* (2006.01)
(Continued)

(52) U.S. Cl.
CPC ........... *D06B 11/0023* (2013.01); *B41J 3/407* (2013.01); *B41J 11/44* (2013.01); *B41J 29/393* (2013.01);
(Continued)

(58) Field of Classification Search
None
See application file for complete search history.

(56) References Cited

U.S. PATENT DOCUMENTS 5,671,614 A * 9/1997 Shima ................ D06B 11/0023
66/13
6,092,478 A * 7/2000 Simakrai ................ D05B 19/12
112/475.01
(Continued)

FOREIGN PATENT DOCUMENTS

CN 200996095 Y 12/2007
CN 103930608 B 7/2014
(Continued)

OTHER PUBLICATIONS

International Search Report from PCT/SE2019/050793, dated Oct. 24, 2019, pp. 1-5.
(Continued)

*Primary Examiner* — Binu Thomas
(74) *Attorney, Agent, or Firm* — Robinson & Cole LLP (57) ABSTRACT

A system for in-line treatment of thread for use with a thread consuming device is provided. The system comprises at least one treatment unit being configured to dispense one or more coating substances onto the at least one thread when activated and a thread speed sensor being driven by the motion of the at least one thread. A method is further provided.

10 Claims, 8 Drawing Sheets

(51) Int. Cl.
   *B41J 11/44*   (2006.01)
   *B41J 29/393*  (2006.01)
   *B65H 71/00*   (2006.01)
   *D05C 11/24*   (2006.01)
   *D06B 11/00*   (2006.01)
   *B05C 13/00*   (2006.01)

(52) U.S. Cl.
   CPC ............ *B65H 71/00* (2013.01); *D05C 11/24* (2013.01); *D06P 5/30* (2013.01); *B05C 13/00* (2013.01); *B41J 2203/01* (2020.08); *B65H 2553/41* (2013.01); *B65H 2553/46* (2013.01); *B65H 2553/51* (2013.01)

(56) References Cited

U.S. PATENT DOCUMENTS

| | | | |
|---|---|---|---|
| 6,189,989 B1 * | 2/2001 | Hirabayashi | D06B 11/0023 347/43 |
| 2006/0098200 A1 | 5/2006 | Birlem | |
| 2006/0100736 A1 * | 5/2006 | Kamata | H01B 13/345 700/123 |
| 2009/0241819 A1 * | 10/2009 | Tseng | D06B 11/0023 118/669 |
| 2014/0349034 A1 | 11/2014 | Staberg et al. | |
| 2018/0171520 A1 | 6/2018 | Eklind et al. | |

FOREIGN PATENT DOCUMENTS

| | | |
|---|---|---|
| CN | 205114699 U | 3/2016 |
| CN | 205837251 U | 12/2016 |
| CN | 107849770 A | 3/2018 |
| EP | 1405938 A1 | 4/2004 |
| GB | 2324541 A | 10/1998 |
| JP | S59137096 A | 8/1984 |
| JP | H03185144 A | 8/1991 |
| JP | H06304359 A | 4/1993 |
| JP | H06299458 A | 10/1994 |
| JP | H06305129 A | 11/1994 |
| JP | H08311753 A | 11/1996 |
| JP | H11316196 A * | 11/1999 |
| JP | 2001226870 A | 8/2001 |
| JP | 2002082062 A | 3/2002 |
| JP | 2006240082 A | 9/2006 |
| JP | 2018525548 A | 9/2008 |
| JP | 2008289521 A1 | 12/2008 |
| JP | 2009285266 A | 12/2009 |
| JP | 2012057978 A | 3/2012 |
| JP | 2014040678 A | 3/2014 |
| JP | 2014532121 A | 12/2014 |
| JP | 6305129 B2 | 4/2018 |
| KR | 20100025833 A | 3/2010 |
| KR | 1020180017201 | 2/2018 |
| SE | 1550841 A1 | 12/2016 |
| WO | 2001090461 A1 | 11/2001 |
| WO | 2013039447 | 3/2013 |
| WO | 2016204686 A1 | 12/2016 |
| WO | 2016204687 A1 | 12/2016 |
| WO | 2018044222 A1 | 3/2018 |

OTHER PUBLICATIONS

Notice of Reasons for Rejection issued in corresponding JP Application No. 2021-513888, dated Jul. 18, 2023, pp. 1-2.
Extended European Search Report issued in corresponding EP Application No. 19859672.8, date mailed May 31, 2022, pp. 1-7.
Office Action issued in corresponding UAE Application No. P6000363 2021, pp. 1-6.
Search Report issued in corresponding UAE Application No. P6000363 2021, pp. 1-2.
Japanese Office Action issued in corresponding JP Application No. 2021-513849, mailed Apr. 26, 2024, pp. 1-8.

* cited by examiner

METHOD FOR IN-LINE TREATMENT OF A THREAD AND A SYSTEM THEREFORE COMPRISING A TREATMENT UNIT AND A THREAD SPEED SENSOR

CROSS REFERENCE TO RELATED APPLICATIONS

The instant application is a U.S. National Stage application of and claims priority to PCT/SE2019/050793, filed on Aug. 27, 2019, which is a PCT application of and claims priority to SE Application No. 1851096-6, filed on Sep. 15, 2018, the subject matter of both aforementioned applications are hereby incorporated by reference in their entireties.

TECHNICAL FIELD

The present invention relates to the technical field of thread consuming devices. In particular, the present invention relates to a system comprising a treatment unit to be used in association with such thread consuming device.

BACKGROUND

It has been suggested to provide thread consuming devices, such as embroidery machines or the like, with in-line apparatuses designed to provide the thread with a certain treatment. Such in-line apparatuses could e.g. be used to colour the thread, whereby multiple colour nozzles could replace the current use of multiple pre-coloured threads when producing multi-coloured patterns using embroidery machines. In prior art systems where threads of different colours are used, one thread, having a first specified colour, is used for some stitches while another thread, having a second specified colour, is used for other stitches.

In order to eliminate the obvious drawbacks of the requirement of multiple threads of different colours, the present applicant has filed several patent applications on the technique of in-line colouring of thread, such as WO2016204687 and WO2016204686. The proposed solutions provide improvements in terms of colour quality and also reduces the complexity of the thread consuming device.

However, in order to further improve the quality of the in-line colouring of threads it would be advantageous if the general principle of in-line colouring of a thread could be modified to increase the accuracy in dispensing a correct amount of coating substances on the intended position of the thread being treated.

SUMMARY

An object of the present invention is therefore to provide a solution overcoming the disadvantages of prior art. More specifically, the present invention provides a solution where the length and the speed of the thread is taken into account during the dispensing of the coating substances.

In the present invention, the speed of the thread is measured by a thread speed sensor. In this way, the speed can be measured in an accurate manner without being affected by the elasticity of the thread and/or heat generated from the system. Using a thread speed sensor has several benefits compared to other possible solutions such as measuring the speed using the motor driving the thread. Measuring the speed by the motor driving the thread has several drawbacks, for example, the measurement will be affected by the elasticity of the thread and the generated heat. Moreover, the inlet and outlet forces to the system driven by a motor, and thus the speed, generated by the motor is affected by the other components in the system, which causes uncertainties in the measurements.

In a first aspect, a system for in-line treatment of thread for use with a thread consuming device is provided. The system comprises at least one treatment unit being configured to dispense one or more coating substances onto the at least one thread when activated, and a thread speed sensor being driven by the motion of the at least one thread.

The thread speed sensor may be arranged upstream said at least one treatment unit.

The system may further comprise a control unit being configured to control the operation of said treatment unit.

The control unit may be configured to control activation of said treatment unit based on a predetermined operation scheme of said thread consuming device.

The control unit may be configured to receive speed data from thread speed sensor, and control the operation of the treatment unit based on said received speed data.

The thread speed sensor may comprise a rotational sensor being driven by the motion of at least one thread.

In one embodiment, the rotational sensor comprises a pulley.

The thread speed sensor may further comprise an encoder being in operative communication with the pulley. The encoder may be a rotary encoder.

In one embodiment, the system further comprises a light detection system for illuminating the at least one thread in order to receive light which is reflected from the at least one thread when said at least one thread is illuminated, wherein the light detection system is arranged downstream the at least one treatment unit along the travel direction of the at least one thread.

The light detection system may comprise at least one light source and an optical sensor.

In one embodiment the coating substance is a colouring substance, and wherein the system further comprises a control unit configured to receive data from the light detection system, determine the colour of the colouring substance that has been dispensed to a specified section of the at least one thread based on said received data.

The control unit may further be configured to compare the determined colour against a predetermined colour scheme, and if said determined colour and the predetermined colour scheme does not match within a tolerance limit, generate an alarm signal and/or adjust the operation of the treatment unit.

In one embodiment, the treatment unit comprises a plurality of nozzles arranged at different positions relative the at least one thread, said at least one thread being in motion in use, each nozzle being configured to dispense one or more coating substances onto the at least one thread when activated.

In one embodiment the nozzles are inkjet nozzles.

In one embodiment the system further comprises a thread consuming device.

The thread consuming device may be an embroidery machine, a sewing machine, a knitting machine, a weaving machine, a tufting machine, a thread winding machine, and or any combination thereof.

In a second aspect, a method for in-line treatment of at least one thread for use with a thread consuming device is provided. The method comprises providing a treatment unit being configured to dispense one or more coating substances onto the at least one thread when activated, and providing a thread speed sensor being driven by the motion of the at least one thread.

The method may further comprise controlling activation of said at least one treatment unit based on a predetermined operation scheme of said thread consuming device.

The method may further comprise receiving speed data from the thread speed sensor, and controlling the operation of the treatment unit based on said received speed data.

Definitions

Thread consuming device is in this context any apparatus which in use consumes thread. It may e.g. be an embroidery machine, weaving machine, sewing machine, knitting machine, weaving machine, a tufting machine, a thread winding machine or any other thread consuming apparatus which may benefit from a surface treatment or coating or any other process involving subjecting the thread to a substance, such as dying.

Treatment is in this context any process designed to cause a change of the properties of a thread. Such processes include, but are not limited to, colouring, wetting, lubrication, cleaning, fixing, heating, curing, dying, etc.

Thread is in this context a flexible elongate member or substrate, being thin in width and height direction, and having a longitudinal extension being significantly greater than the longitudinal extension of any parts of the system described herein, as well as than its width and height dimensions. Typically, a thread may consist of a plurality of plies being bundled or twisted together. The term thread thus includes a yarn, wire, strand, filament, etc. made of various materials such as glass fibre, wool, cotton, synthetic materials such as polymers, metals, polyester, viscos, or e.g. a mixture of wool, cotton, polymer, or metal or any combination thereof.

Within this specification, all references to upstream and/or downstream should be interpreted as relative positions during normal operation of the thread consuming device, i.e. when the device is operating to treat an elongated substrate, such as a thread, continuously moving through the device in a normal operating direction. Hence, an upstream component is arranged such that a specific part of the thread passes it before it passes a downstream component.

BRIEF DESCRIPTION OF THE DRAWINGS

Embodiments of the invention will be described in the following description of the present invention; reference being made to the appended drawings which illustrate non-limiting examples of how the inventive concept can be reduced into practice.

DETAILED DESCRIPTION

An idea of the present invention is to provide a system and method for distributing a coating substance onto a thread in a controlled manner, for use in association with a thread consumption device. Starting in FIG. 1a a schematic view of system 10 for in-line treatment of thread is shown. The system 10 comprises a treatment unit 100 for dispensing one or more coating substances onto at least one thread. The system 10 further comprises at least one thread consuming device 15, which may e.g. be in the form of one or several embroidery machine(s), a weaving machine(s), a sewing machine(s), knitting machine(s), a tufting machine(s), a thread winding machine(s) etc. The system thereby forms a thread consuming unit, including the at least one thread consuming device 15 and the treatment unit 100. It should be noted that more than one thread can be used in the thread consuming device(s).

Figure 5A:
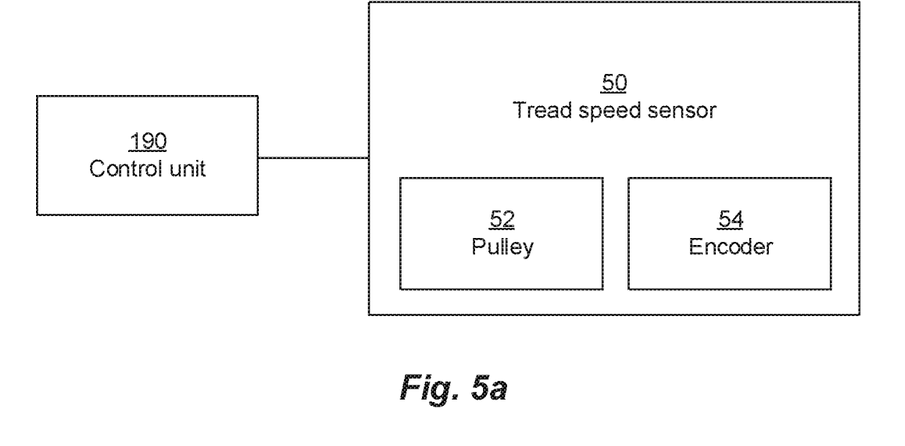
FIG. 5a is a schematic view of a thread speed sensor according to an embodiment.
Figure 5B:
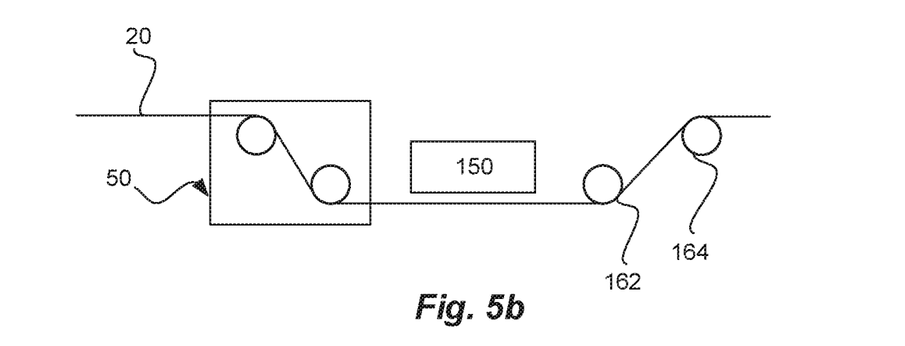
FIG. 5b is a schematic view of a thread speed sensor according to an embodiment.
Figure 5C:
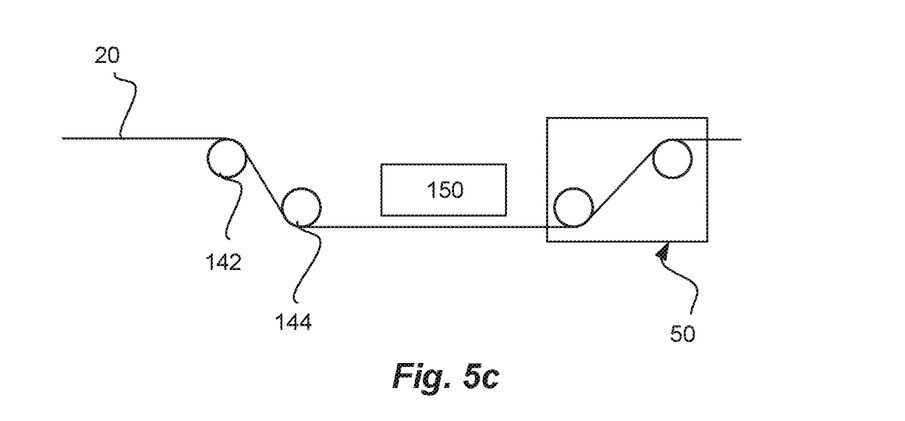
FIG. 5c is a schematic view of a thread speed sensor according to an embodiment.

It should be noted that several aspects of a system are described within this specification, and they do not require the inclusion of the thread consuming device 15. As will be further understood from the following, for all embodiments the system for in-line treatment of thread requires a treatment unit 100, to be used with a thread consuming device, and a thread speed sensor 50 (see e.g. FIG. 5) for measuring the thread speed of the thread.

Figure 1A:
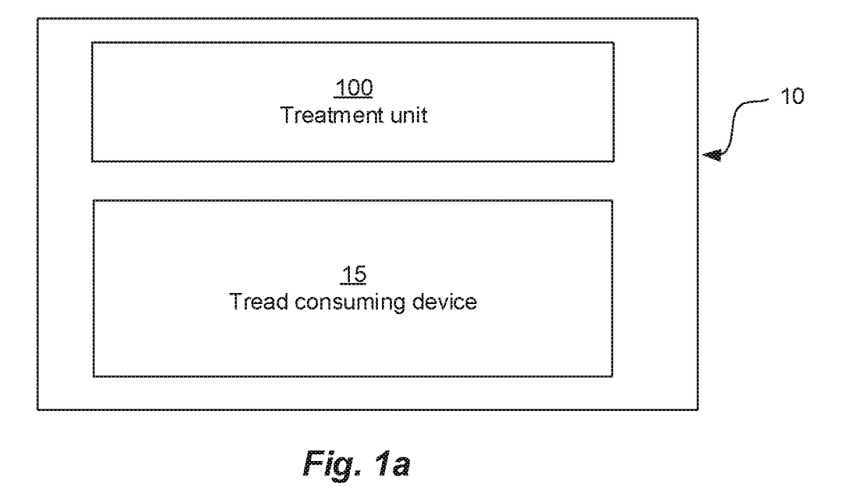
FIG. 1a is a schematic view of a system for in-line treatment of thread according to an embodiment.
Figure 1B:
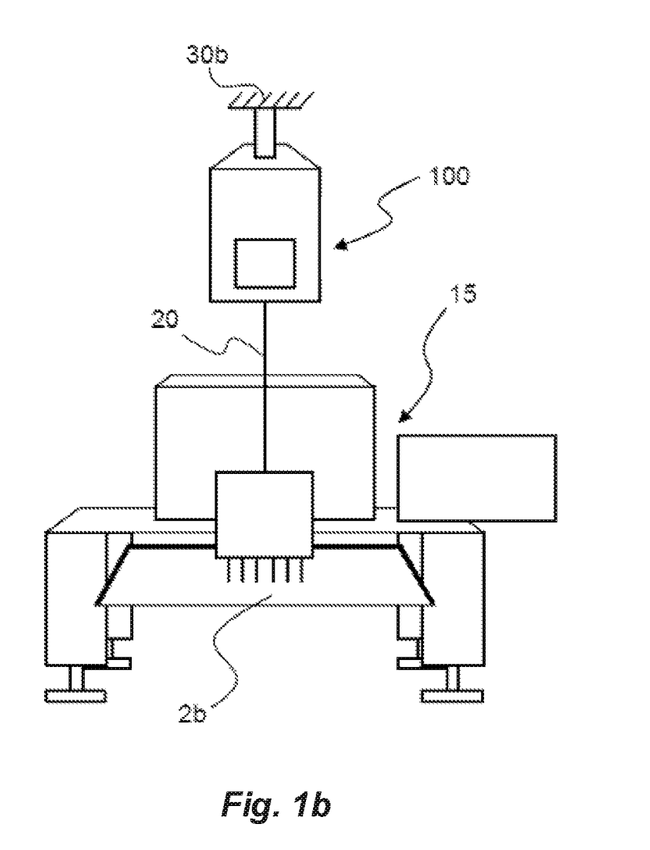
FIG. 1b is a perspective view of a system having a thread consuming device and a treatment unit according to an embodiment.

Now turning to FIG. 1b the thread consuming device 15 is exemplified as an embroidery machine, here illustrated as a single-head embroidery machine, being equipped with a treatment unit 100. The embroidery machine 15 comprises a moveable stage 2b carrying the fabric to be embroidered. During operation the moveable stage 2b is controlled to rapidly change its position in the X and Y direction (i.e. in this case the horizontal plane, but it could also be in the vertical plane).

The treatment unit 100 allows the embroidery machine 15 to operate without the provision of uniquely pre-coloured threads, as is required for conventional embroidery machines. Instead, the treatment unit 100 provides in-line colouring of a thread 20 in accordance with predetermined colouring patterns, such that a coloured embroidery can be produced. The treatment unit thus replaces individual thread reels as is present in prior art systems.

As is shown in FIG. 1b the only connection between the treatment unit 100 and the embroidery machine 15 is the thread 20, as well as electrical connections (not shown). The treatment unit 100 is thus provided as a stand-alone unit having no mechanical connection with the moveable stage 2b. In an optional embodiment, the stand-alone treatment unit 100 is mounted to the thread consuming device 15 via a suspension arrangement for reducing the transmission of vibrations to the treatment unit 100.

Figure 2:
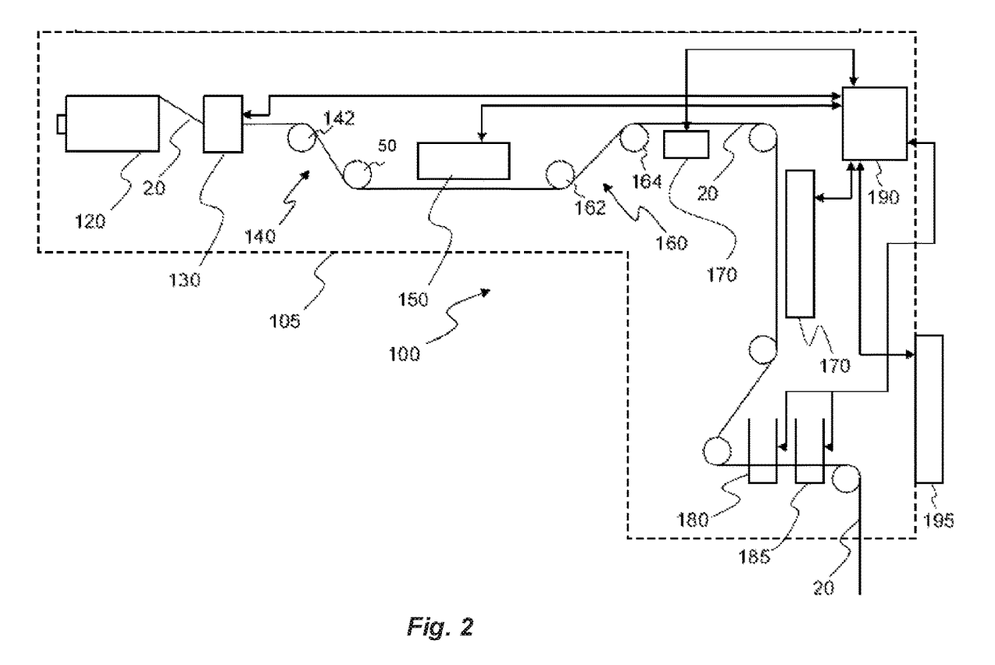
FIG. 2 is a schematic view of a treatment unit for use with a system according to an embodiment.

The various components of the treatment unit 100 are shown in FIG. 2. As can be seen in FIG. 2 a majority of the components are arranged inside a housing 105. Immediately downstream the thread reel 120 a thread feeder 130 may be arranged, which is configured to pull the thread forward through the treatment unit 100. The thread feeder 130 is not described further herein, but for a more general understanding the thread feeder 130 receives and forwards the thread 20. For this, the thread feeder 130 is controlled by a control unit 190 described further below. The thread feeder 130 is preferably also configured to control the thread tension, e.g. by means of a driven roller, an encoder wheel, and one or more thread guides. After passing the thread feeder 130 the thread 20 engages with a thread guiding device 140.

The thread guiding device 140, which may e.g. be in the form of one or more guiding rollers 142 or other suitable means, is ensuring that the thread 20 is aligned with one or more treatment nozzles forming part of discharge device 150.

Figure 3:
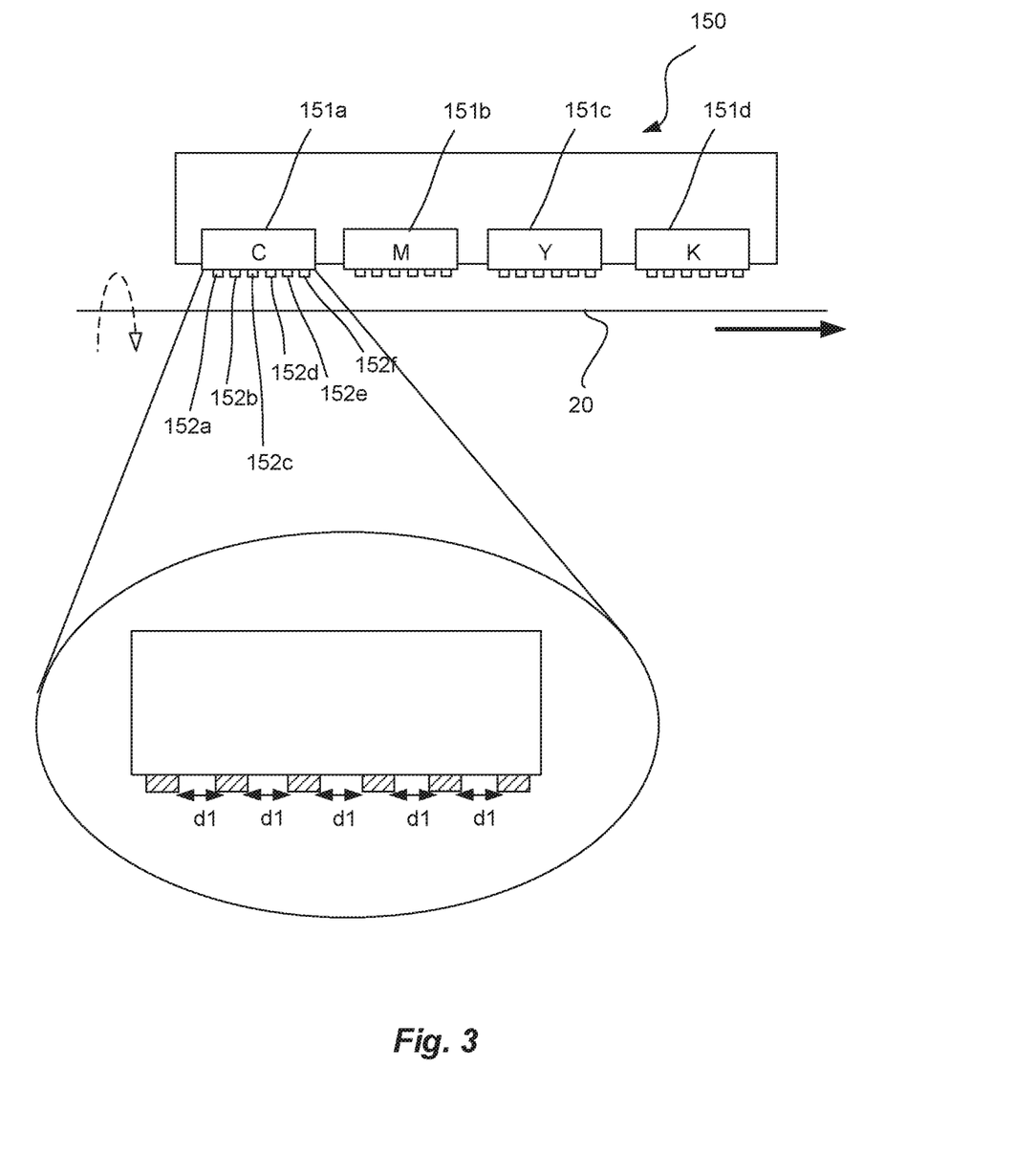
FIG. 3 is a schematic view of a discharge device forming part of a treatment unit.

The discharge device 150 is configured to discharge treatment substance, such as a colouring substance, onto the thread 20 as it passes the discharge device 150. For this the nozzles are arranged preferably in the longitudinal direction of the thread 20 as will be further explained in relation to FIGS. 3*a-c*.

The discharge device 150 may be moveable by means of a drive unit (not shown). Having a drive unit will make it possible to arrange the discharge device 150 in different operating states in order to perform different tasks, such as for example a first state of dispensing a coating substance to a thread and a second state of performing a cleaning session, or other maintenance or idling. For this a drive unit may be connected to the discharge device 150. The drive unit may be configured to move the discharge device 150 between an idle position and an operational position by means of a transmission having different transmission ratios during the motion from the idle position towards the operational position.

Downstream the discharge device 150 another thread guiding device 160 is provided. The second thread guiding device 160 is cooperating with the first thread guiding device 140 such that the position of the thread 20 is correct during its travel along the discharge device 150. The second thread guiding device 160 may e.g. be in the form of one or more guiding rollers 162, 164, although it may also be designed to induce a rotation of the thread 20 along its longitudinal axis. This extra functionality can provide advantages to the colouring as also will be described below.

The system 10 may further comprise a thread speed sensor 50 configured to measure the speed of the thread 20 passing through the system 10. In FIG. 2, the thread speed sensor 50 is arranged just before the discharge device 150. The thread speed sensor 50 may in some embodiments replace the thread guiding device 140.

In another embodiment, the thread speed sensor 50 is arranged just after the discharge device 150. The thread speed sensor 50 may in some embodiments replace the second thread guiding device 160. In yet one embodiment, two thread sensors are provided, the first arranged before the discharge device 150 and the second arranged after the discharge device 150. The thread speed sensor 50 will be described more in detail with reference to FIG. 5.

The thread 20 is then fed forward to pass one or more fixation units 170 which are provided in order to fixate the treatment substance to the thread 20. The fixation unit 170 preferably comprises heating means, such as a hot air supply or heated elements, or an UV light source such that the treatment substance, e.g. a colouring substance, is cured or fixated onto the thread 20. As is shown in FIG. 2 the fixation unit 170 may either be arranged horizontally, vertically, or at an angle between horizontally and vertically.

Before exiting the housing 105 the thread 20 can pass a cleaning unit 180, such as an ultrasonic bath, where unwanted particles are removed from the thread 20. As the treatment substance is fixated onto the thread 20, the cleaning unit 180 will leave the treatment substance unaffected.

The treatment unit 100 may further comprise a lubrication unit 185 arranged inside the housing 105. Additional thread buffers and feeders (not shown) may also be included in the treatment unit 100, arranged at various positions in the thread path.

The thread 20 preferably exits the treatment unit 100 through an aperture or similar, whereby the thread 20 is forwarded to an associated thread consuming device, such as an embroidery machine 15 as is shown in FIGS. 1*a-b*.

The thread feeder 130 and the other components engaging with the thread 20 during operation are preferably configured such that the force required to pull the thread 20 from the treatment unit 100, i.e. the pulling force applied by the downstream embroidery machine 15, is approximately the same as if the treatment unit 100 was replaced by prior art thread reels.

A control unit 190 with associated electronics, such as power electronics, communication modules, memories, etc. is also provided. The control unit 190 is connected to the thread feeder 130, the discharge device 150, and the fixation unit 170 for allowing control of the operation of these components. Further, the control unit 190 is configured to controlling operation of the entire treatment unit 100 including the cleaning unit 180, the lubrication unit 185, a disruption of the thread 20, the thread speed at various position along the treatment unit 100, the thread buffers, etc. The control unit 190 may also be configured to receive control signals from one or more components of the treatment unit 100, e.g. control signals for triggering specific control, or other information relating to e.g. thread consumption by the embroidery machine 15.

The control unit 190 may be implemented by any commercially available CPU ("Central Processing Unit"), DSP ("digital signal processor") or any other electronic programmable logic device, or a combination of such processors or other electronic programmable logic device. The control unit 190 may be implemented using instructions that enable hardware functionality, for example, by using executable computer program instructions in a general-purpose or special-purpose processor that may be stored on a computer readable storage medium (disk, memory etc) to be executed by such a processor.

In one embodiment, a user interface is also provided, preferably via a display 195 arranged at the front end of the housing 105. The display 195 allows a user to interact with the control unit 190 and is thus connected thereto, so that the control parameters of the thread feeder 130, the discharge device 150, the fixation unit 170, etc. may be set depending on process specifications. The display 195 may also preferably be used for alerting the user of critical situations, whereby the display 195 may be used for the control unit 190 to issue alarms or the like.

It should be noted that the components described above may not necessarily be included in the stand-alone treatment unit 100, but instead the components of the treatment unit 100 may be separated into several units, of which at least one unit is a stand-alone unit. Preferably, the stand-alone unit includes at least the at least one discharge device 150.

In FIG. 3 a discharge device 150 is shown, forming part of the treatment unit 100 as described above. The direction of movement of the thread 20 in use is indicated by the solid arrow in FIG. 3. As will soon be described in more detail, the discharge device 150 comprises a plurality of nozzles 152a-f arranged at different longitudinal positions (for example spaced by a distance d1) along the thread 20 which passes by the treatment unit 100 during use.

Each nozzle 152a-f is arranged to dispense a coating substance, such as ink, onto the thread 20 when the nozzle is activated. The coating substance is absorbed by the thread 20, e.g. at different circumferential positions of the thread 20 when the thread 20 twists about its longitudinal axis. The relative position of two adjacently dispensed droplets of coating substance may be selected such that the droplets will overlap.

The treatment unit 100 comprises one or more discharge devices 150. Each discharge device 150 is preferably formed as a series of ink-jet print heads 151a-d, each print head 151a-d having one or more nozzle arrays. Each nozzle array typically comprises hundreds or thousands of nozzles. For illustrative purpose only six nozzles 152a-f are shown for one print head 151a-d; it should however be realized that each nozzle array may be provided with hundreds or thousands of nozzles 152 each. As an example, each print head 151a-d may be associated with a single colour; in the shown example, the discharge device 150 has four print heads 151a-d, each print head 151a-d being associated with a specific colour according to the CMYK standard. However, other colouring models may be used as well.

The exact configuration of the treatment unit 100 may vary. For example, the treatment unit 100 is provided with a single discharge device 150 having a plurality of print heads 151a-d. Each print head 151a-d is in turn provided with a plurality of nozzles 152a-f.

In another embodiment the treatment unit 100 is provided with several discharge devices 150, arranged either in series or in parallel. Each discharge device 150 is then provided with a plurality of print heads 151a-d. If serially arranged, the upstream discharge device 150 may have print heads 151a-d being associated with one or more colours of a specific colour standard, while the downstream discharge device 150 has print heads 151a-d being associated with other colours of the same colour standard. If arranged in parallel, each discharge device 150 may have print heads 151a-d being associated with all colours of a specific colour standard, but with different threads 20. For such embodiment, two separate threads 20 can be treated simultaneously and in parallel. Combinations of parallel/serial configurations are of course also possible.

In a yet further embodiment, the discharge device 150 is only having a single print head 151a-d; dynamic colouring of the thread 20 would then require several discharge devices 150 of the treatment unit 100.

Each nozzle 152a-f may dispense a coating substance having a colour according to the CMYK colour model, where the primary colours are Cyan, Magenta, Yellow, and Black. It may thus be possible to dispense a wide variety of colours onto the thread by activating nozzles 152a-f such that the total colouring substance of a specific length of the thread 20 will be a mix of the colouring substances dispensed by the nozzles 152a-f. As explained earlier, this is preferably achieved by having several print heads 151a-d arranged in series, whereby the nozzles 152a-f of a specific print head 151a-d are dedicated to a single colour.

In another embodiment, each nozzle 152a-f-f dispenses a coating substance having a colour comprising a mix of two or more primary colours of the CMYK colour model.

The control unit 190 is configured to control the activation of the nozzles 152a-f such as the coating substance is emitted onto the thread 20 as it passes through the treatment unit 100, and especially pass the discharge device 150. By such configuration very precise colouring of the thread 20 is possible e.g. in order to provide advanced embroidery patterns, visually extremely sophisticated by means of the colouring provided by the treatment unit 100.

For a colouring operation the control unit 190 receives one or more input signals specifying the desired colour and/or colouring effect. The colour input preferably includes information regarding the exact colour, as well as the longitudinal start and stop positions of the thread 20 for that particular colour. The longitudinal start and stop position could be represented by specific time values if the thread speed is determined.

Figure 4A:
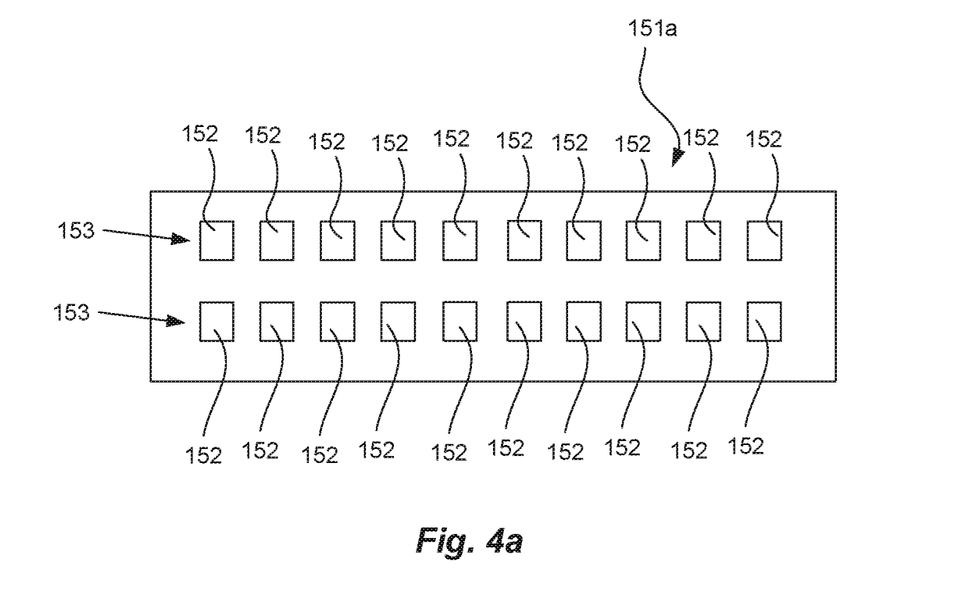
FIG. 4a is a schematic top view of a part of a discharge device according to an embodiment.
Figure 4B:
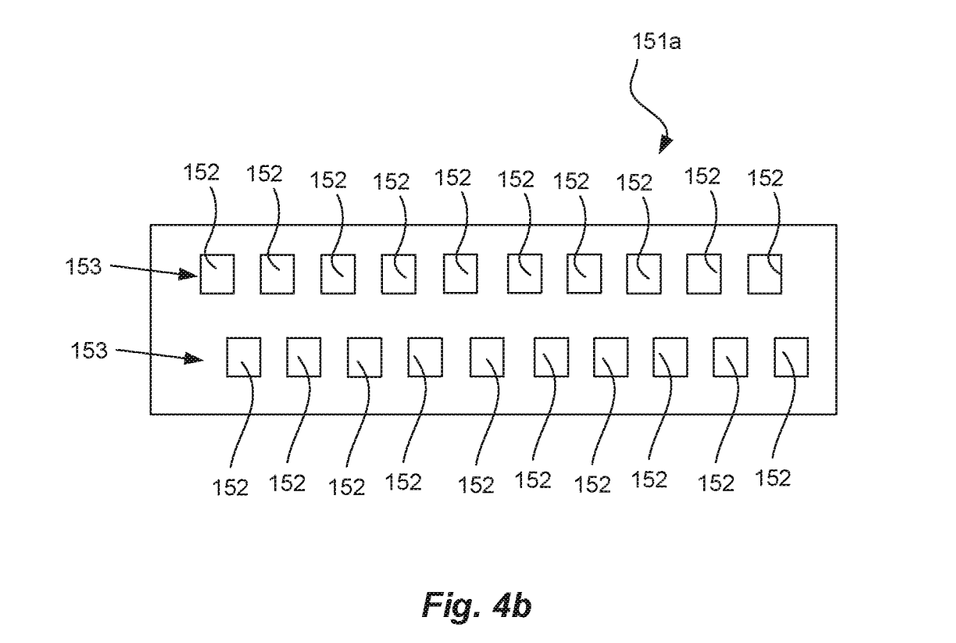
FIG. 4b is a schematic top view of a part of a discharge device according to an embodiment.

FIG. 4a-b illustrates a respective top view of a print head 151a. The print head 151a has a planar surface on which the nozzles 152 are arranged. As mentioned earlier, the total number of nozzles 152 of a single print head can be up to several thousands, provided on a print head 151a in the size of a couple of centimeters. In the shown example, a far less number of nozzles 152 are shown. The nozzles 152 can be distributed in one or more nozzle arrays 153. In FIG. 4a, the nozzles 152 are distributed in two parallel arrays 153. The arrays 153 are aligned with each other, such that nozzles 152 of one array 153 are arranged adjacent a nozzle 152 of the other array 153.

FIG. 4b shows a similar example, however there is a longitudinal offset between the two arrays 153.

FIG. 5a-c are schematic illustrations of a thread speed sensor 50. The thread speed sensor 50 is driven by the motion of the at least one thread in the system 10. The thread is in turn driven by a motor or some other type of drive unit.

As seen in FIG. 5a, the thread speed sensor 50 may comprise a rotational sensor 52 being driven by the motion of at least one thread 20. The rotational sensor may comprise or consist of a wheel such as a pulley 52 or a guiding roller.

The thread speed sensor 50 may further comprise an encoder 54 being in operative communication with the pulley 52. In one embodiment the encoder 54 is a rotary encoder or a shaft encoder. The rotary encoder converts the angular position or motion to output signals that can be processed by the control unit 190 of the system 10. The encoder thus provides information of the motion of the pulley, and thus the motion of the thread. The control unit 190 is configured to use this data to determine the speed of the thread.

In one embodiment the encoder is an absolute encoder. In yet another embodiment the encoder is an incremental encoder.

In a preferred embodiment, the thread speed sensor 50 is arranged upstream said at least one treatment unit 100. The thread speed sensor 50 is preferably arranged upstream the treatment unit 100 and close to the treatment unit 100. FIG. 5b and FIG. 5c illustrates two possible arrangement of the thread speed sensor 50. In FIG. 5b, the thread speed sensor 50 is arranged just before the discharge device 150. In this embodiment, the thread speed sensor 50 replace the thread guiding device 140. Hence, the thread speed sensor 50 comprises one or more guiding rollers or other suitable means for ensuring that the thread 20 is aligned with one or more treatment nozzles forming part of discharge device 150.

In FIG. 5c, the thread speed sensor 50 is arranged just after the discharge device 150. In this embodiment, the thread speed sensor 50 replace the thread guiding device 160. Hence, the thread speed sensor 50 comprises one or more guiding rollers or other suitable means for ensuring that the position of the thread 20 is correct during its travel along the discharge device 150.

The control unit 190, as already been described, may be configured to control the activation of the system 10 based on a predetermined operation scheme. More specifically, the control unit 190 may be configured to control the activation of the treatment unit 100 based on a predetermined operation scheme of the thread consuming device 15. The predetermined operation scheme may be related to the speed of the thread, as well as other thread consumption parameters.

The control unit 190 is configured to receive data from the thread speed sensor. The data is preferably related to the speed of the thread 20. Based on the received data, the control unit 190 is further configured to control different parts of the system 10. In one embodiment the control unit 190 is configured to control the operation of the treatment unit 100 and/or other parts of the system 10 based on the received speed data.

In one embodiment, the control unit 190 is configured to control the operation of the at least one discharge device 150 based on the speed data. The control unit may control the operation of the one or more discharge device(s) 150, the operation of the print heads 151a-d and/or the operation of one or a plurality of nozzles 152a-f.

The control unit 190 may for example be configured to adjust the speed, movement, timing of the print heads, nozzle arrays or nozzles, as well as determining the number of active nozzles. For example, the control unit 190 may be configured to control the number of active nozzles and/or nozzle arrays and/or print heads based on the thread speed.

Figure 6A:
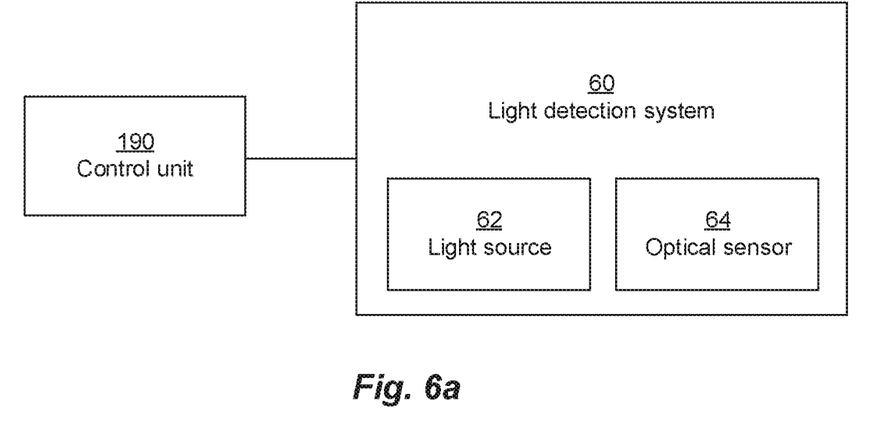
FIG. 6a is a schematic view of a light detection system according to an embodiment.
Figure 6B:
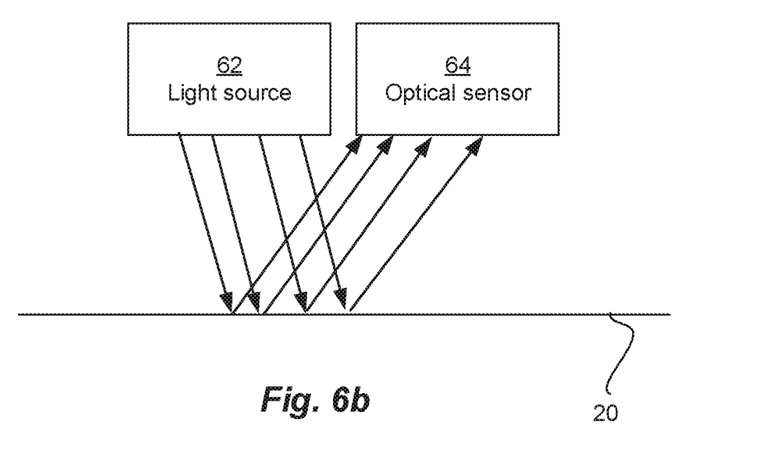
FIG. 6b is a schematic view of a light detection system of FIG. 6a according to an embodiment.

Since the thread can be elastic and since it can be affected by different processing steps of the system 10, it would also be beneficial to receive feedback of the actual thread consumption in a later stage of the process. This can be achieved by the addition of a light detection system 60, as shown in FIG. 6a-b. The light detection system 60 is arranged to illuminate the thread 20 in order to receive light which is reflected from the thread 20 when the thread 20 is illuminated, as illustrated in FIG. 6b. The light detection system 60 is arranged downstream the at least one treatment unit 100 along the travel direction of the at least one thread 20.

In one embodiment the light detection system 60 comprises at least one light source 62 and at least an optical sensor 64. In an alternative embodiment, the light detection system 60 comprises an optical sensor 64 being configured to act as a light source as well. The optical sensor 60 may for example be a monochrome sensor, a colour sensor or a spectrophotometer.

The control unit 190 may be configured to process the data received from the light detection system 60. The control unit 190 may for example be configured to determine the colour of the colouring substance that has been dispensed to the thread. In a preferred embodiment, the control unit 190 is configured to determine the colour of the colouring substance that has been dispensed to a specified section of the at least one thread 20.

The control unit 190 may further be configured to compare the determined colour against a predetermined colour scheme in order to determine if the right colour is applied to the right section of the thread. In case the determined colour and the predetermined colour scheme does not match within a tolerance limit, the control unit 190 may be configured to generate an alarm signal. The alarm signal may for example be shown on the display 195, and/or be an audible alarm and/or a visual alarm for example by illuminating light or the like.

Additionally or alternatively, if the determined colour and the predetermined colour scheme does not match within a tolerance limit, the control unit 190 may be configured to adjust the position of different components of the system 10 and/or to adjust the colour queue of the treatment unit 100. By adjusting the position, the system can account for a possible altered length of the thread (being shrunk or extended).

Figure 6C:
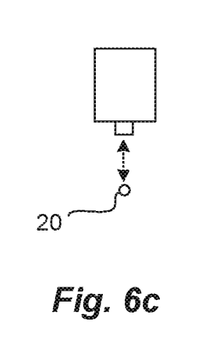
FIG. 6c is a schematic view illustrating when the system is arranged in a first position according to an embodiment.
Figure 6D:
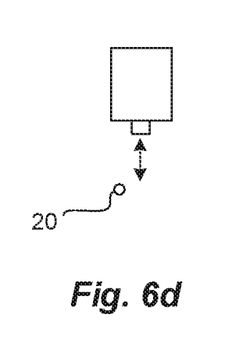
FIG. 6d is a schematic view illustrating when the system is arranged in a second position according to an embodiment.

The light detection system 60 may further be configured to generate data to the control unit 190 that can be used to determine the position of one or more of the components of the system 10. For example, at least one of the plurality of nozzles are movable in relation to the thread between a first position and a second position. In the first positon, the at least one of the plurality of nozzles and the at least one thread are aligned. When the system is in the first position, the one more coating substances dispensed from the at least one nozzle hit the at least one thread 20. This is schematically illustrated in FIGS. 6c-d, where FIG. 6c illustrates the system 10 being arranged in a first position and FIG. 6d illustrates the system 10 being arranged in a second position. In a second position, the at least one of the plurality of nozzles and the at least one thread are unaligned. When the system is in the second position, the one more coating substances dispensed from the at least one nozzle miss the at least one thread 20.

The control unit 190 is thus configured to, based on the data received from the light detection system, determine if the system is in its first or second position. This data can be used to determine the nozzle position at the time when the treatment unit is dispensing one or more coating substances onto the at least one thread 20 (or in a second position; when it is no longer dispensing one or more coating substances onto the thread), and to store said position data. This information may for example be beneficial in order to evaluate if the discharge device 150 is working properly.

In one embodiment the control unit 190 is configured to combine the speed data received from the speed sensor 50 and the data received from the light detection system in order to control different parts of the system 10, such as for example controlling the dispensing device 150.

Figure 7:
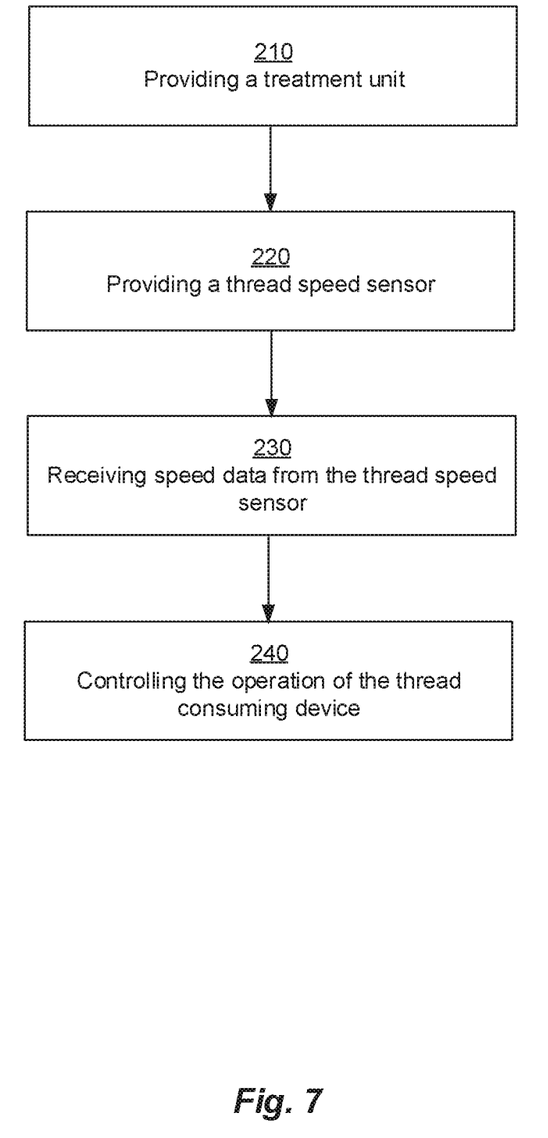
FIG. 7 is a schematic view of a method according to an embodiment.

FIG. 7 illustrates a method for in-line treatment of at least one thread 20 for use with a thread consuming device 15. The method comprises the steps of providing 210 a treatment unit 100 being configured to dispense one or more coating substances onto the at least one thread when activated and providing 220 a thread speed sensor 50 being driven by the motion of the at least one thread 20.

The method further comprises receiving 230 speed data from the thread speed sensor 50, and controlling 240 the operation of the at least one treatment unit 100 based on said received speed data.

Figure 8A:
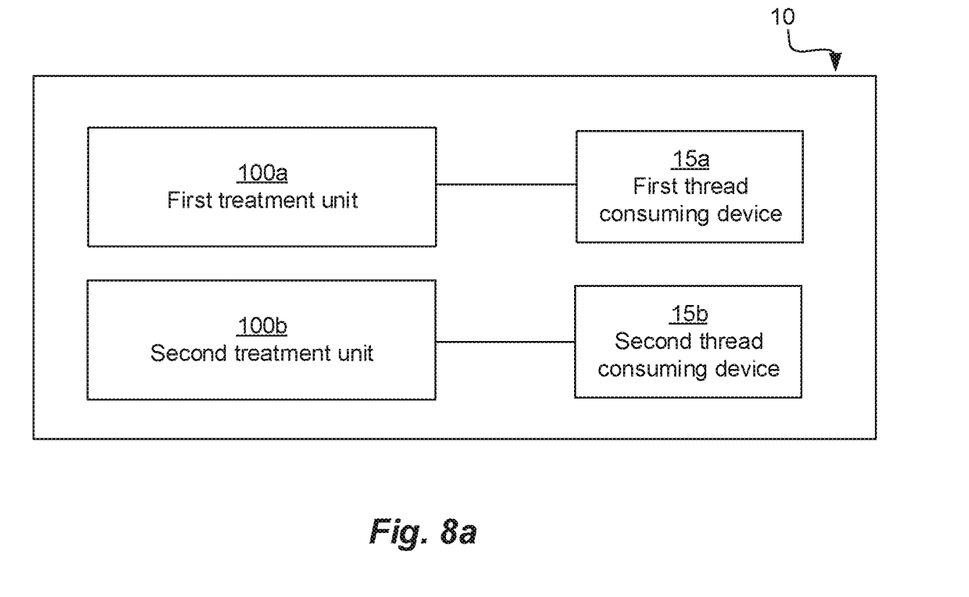
FIG. 8a is a schematic view of a system according to an embodiment.
Figure 8B:
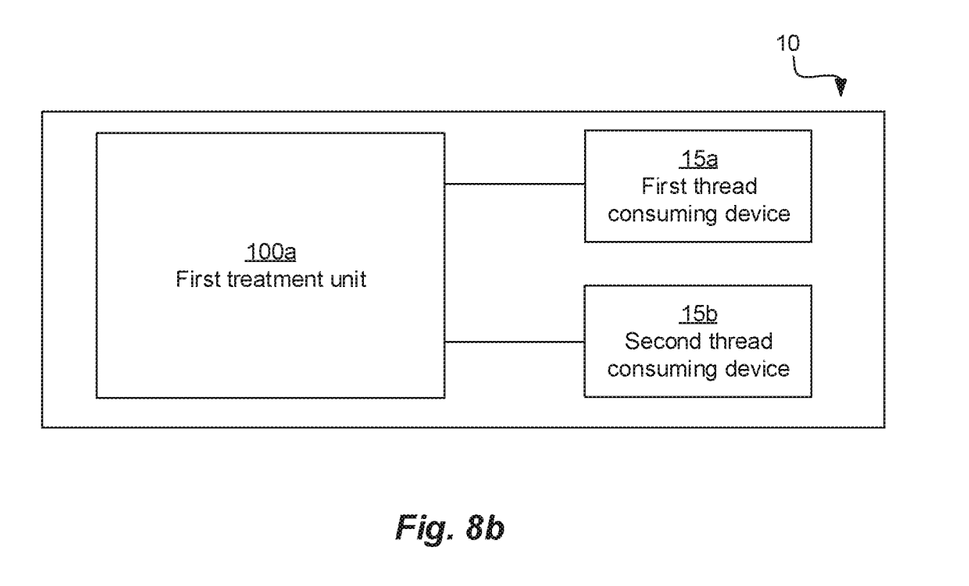
FIG. 8b is a schematic view of a system according to an embodiment.

Although the present invention has been mainly described with reference to a system comprising one treatment unit 100 and one thread consuming device 15, it should be understood by a person skilled in the art that the inventive features could be applied to other systems as well. FIGS. 8a-b illustrates two examples of such alternative systems.

In FIG. 8a, the system 10 comprises a first and a second treatment unit 100a, 100b as well as a first and a second thread consuming device 15a-b. Each treatment unit 100a, 100b is controlling and performing the operations on each thread consuming device 15a-b. It should be noted that the first and second treatment unit 100*a*, although being separated may share one or more components. In one embodiment, the control unit 190 is arranged as a separate unit from the first and second treatment unit 100*a*, 100*b* and one control unit 190 is thus configured to control the operation of both treatment units 100*a*, 100*b* and correspondingly the operation of both thread consuming devices 15*a*-*b*.

In FIG. 8*b*, the system 10 comprises one treatment unit 100*a* and a first and a second thread consuming device 15*a*-*b*. In this embodiment, one treatment unit 100*a* is configured to control and perform the operation of the two thread consuming devices 15*a*-*b*.

It should be noted that although only two treatment units and two thread consuming devices are shown in FIG. 8*a*, and only one treatment unit and two thread consuming devices are shown in FIG. 8*b*, it should be understood that any reasonable number of treatment units and/or thread consuming devices could be present in the system 10.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

What is claimed is:

1. A system for in-line treatment of thread, comprising:
   a treatment unit comprising at least one discharge device, wherein the at least one discharge device comprises a plurality of nozzles arranged at different positions relative the at least one thread, the at least one thread being in motion in use, each nozzle being configured to dispense one or more coating substances onto at least one thread when activated;
   a thread speed sensor configured to measure a speed of the at least one thread, wherein the thread speed sensor comprises a rotational sensor being driven by the motion of at least one thread and comprising a pulley and an encoder being in operative communication with the pulley; and
   a control unit configured to receive speed data from the thread speed sensor, and control operation of the at least one discharge device based on the received speed data;
   wherein the thread speed sensor is arranged upstream of the treatment unit;
   wherein the control unit is configured to control the plurality of nozzles for coloring of the thread;
   wherein the control unit is configured to receive at least one input signal specifying a color or coloring effect, and longitudinal start and stop positions for the color or color effect.

2. The system according to claim 1, wherein the control unit is further configured to control activation of the treatment unit based on an operation scheme of a thread consuming device.

3. The system according to claim 1, wherein the encoder is a rotary encoder.

4. The system according to claim 1, further comprising a light detection system configured to illuminate the at least one thread in order to receive light which is reflected from the at least one thread when the at least one thread is illuminated, wherein the light detection system is arranged downstream of the at least one treatment unit along a travel direction of the at least one thread.

5. The system according to claim 4, wherein the light detection system comprises at least one light source and an optical sensor.

6. The system according to claim 4, wherein the coating substance is a coloring substance, and the control unit is further configured to:
   receive data from the light detection system, and
   determine a color of the coloring substance that is dispensed to a specified section of the at least one thread based on the received data.

7. The system according to claim 6, wherein the control unit is further configured to compare the determined color against a color scheme, and in response to the determined color and the color scheme not matching within a tolerance limit, generate an alarm signal and/or adjust operation of the treatment unit.

8. The system according to claim 1, wherein the nozzles are inkjet nozzles.

9. The system according to claim 1, further comprising a thread consuming device.

10. The system according to claim 9, wherein the thread consuming device is an embroidery machine, a sewing machine, a knitting machine, a weaving machine, a tufting machine, a thread winding machine, or any combination thereof.

* * * * *

UNITED STATES PATENT AND TRADEMARK OFFICE
CERTIFICATE OF CORRECTION

| | | |
|---|---|---|
| PATENT NO. | : 12,448,713 B2 | Page 1 of 1 |
| APPLICATION NO. | : 17/275759 | |
| DATED | : October 21, 2025 | |
| INVENTOR(S) | : Martin Eklind et al. | |

It is certified that error appears in the above-identified patent and that said Letters Patent is hereby corrected as shown below:

On the Title Page

Item (71) the APPLICANT should be:
Coloreel International Holdings Limited
Hong Kong (CN)

Signed and Sealed this
Thirteenth Day of January, 2026

John A. Squires
*Director of the United States Patent and Trademark Office*